United States Patent
Ryu et al.

(10) Patent No.: US 7,397,784 B2
(45) Date of Patent: Jul. 8, 2008

(54) RAKE RECEIVING APPARATUS AND METHOD IN A DIRECT SEQUENCE CDMA MOBILE COMMUNICATION SYSTEM

(75) Inventors: Dong-Ryeol Ryu, Seoul (KR); Seong-Kyu Hwang, Seoul (KR); Jae-Hawk Lee, Seoul (KR); Jeoung-Gil Lee, Suwon-shi (KR); Chae-Man Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 796 days.

(21) Appl. No.: 10/681,104

(22) Filed: Oct. 9, 2003

(65) Prior Publication Data
US 2004/0253934 A1    Dec. 16, 2004

(30) Foreign Application Priority Data
Jun. 10, 2003    (KR) .................... 10-2003-0037201

(51) Int. Cl.
*H04J 3/00*    (2006.01)
(52) U.S. Cl. .................... 370/345; 370/342; 370/335; 375/148; 375/349
(58) Field of Classification Search ............... 370/206, 370/342, 147, 335, 209, 345; 375/349, 148, 375/144; 455/132, 506, 101
See application file for complete search history.

(56) References Cited

U.S. PATENT DOCUMENTS

| | | | | |
|---|---|---|---|---|
| 6,154,487 A * | 11/2000 | Murai et al. | ................. | 375/150 |
| 6,188,682 B1 | 2/2001 | Takagi et al. | ................. | 370/342 |
| 6,269,075 B1 * | 7/2001 | Tran | ........................... | 370/206 |
| 6,580,750 B2 | 6/2003 | Aue | .......................... | 375/150 |
| 2001/0048712 A1 * | 12/2001 | Tomita et al. | ............... | 375/148 |
| 2003/0108090 A1 * | 6/2003 | Giancola | ..................... | 375/148 |
| 2003/0123528 A1 * | 7/2003 | Hackett | ...................... | 375/148 |
| 2004/0028121 A1 * | 2/2004 | Fitton | ......................... | 375/144 |
| 2004/0120387 A1 * | 6/2004 | Bultan et al. | ................ | 375/149 |
| 2004/0170220 A1 * | 9/2004 | Hackett | ...................... | 375/148 |
| 2004/0240532 A1 * | 12/2004 | Reznik et al. | ............... | 375/148 |

\* cited by examiner

*Primary Examiner*—Tan Trinh
(74) *Attorney, Agent, or Firm*—Roylance, Abrams, Berdo & Goodman, L.L.P.

(57) ABSTRACT

An apparatus and method of receiving multi-path signals in a direct sequence Code Division Multiple Access (CDMA) mobile communication system is disclosed. Timing control signals from respective fingers are collected, and relations among positions of time delays where the respective fingers intend to perform a demodulation are analyzed. If it is determined that the time delay position for a specified finger approaches the time delay position of the finger allocated with an adjacent multi-path as close as a threshold value, the distance between the time delay positions is compulsorily kept as the threshold value. This can be effected by making the timing control signal of the finger allocated with the adjacent multi-path be equally used in the specified finger.

20 Claims, 10 Drawing Sheets

RAKE RECEIVING APPARATUS AND METHOD IN A DIRECT SEQUENCE CDMA MOBILE COMMUNICATION SYSTEM

PRIORITY

This application claims priority to an application entitled "Rake receiving apparatus and method in a direct sequence Code Division Multiple Access (CDMA) mobile communication system" filed in the Korean Industrial Property Office on Jun. 10, 2003 and assigned Serial No. 2003-37201, the contents of which are incorporated herein by reference.

BACKGROUND OF THE INVENTION

1. Field of the Invention

The present invention relates to an apparatus and method of receiving multi-path signals in a direct sequence CDMA mobile communication system.

2. Description of the Related Art

In light of the rapid increasing trend of wireless communication services, a saturation phenomenon of the wireless propagation spectrums can be easily anticipated. Accordingly, it is necessary to develop a new wireless communication technique having a superior frequency efficiency. A representative example of such a wireless communication technique may be a code division multiple access (CDMA) system.

In the CDMA system, a wide frequency band is commonly and simultaneously used by many users. That is, respective users simultaneously transmit signals modulated to wide bands using a diffusion band method, and detect a signal transmitted from a desired person using respective codes (or sequences). In the mobile communication system using the CDMA system, the transmitted data is not easily exposed, and a high-grade security can be achieved in comparison to other multi-connection systems. The CDMA system is divided into a direct sequence CDMA (DS/CDMA) system, a frequency hopping CDMA (FH/CDMA) system, etc., in accordance with a frequency diffusing method.

The DS/CDMA system diffuses a signal spectrum area of a signal to be transmitted by coding the signal using a user's inherent pseudo-noise (PN) sequence, and converts the signal into a wideband signal. In the DS/CDMA system, a signal transmission through a multi-path is typically performed. In the DS/CDMA mobile communication system, a multi-path receiver (hereinafter referred to as a "rake receiver") demodulates the multi-path signals received through different paths, and has a time diversity effect. For this, the rake receiver has a plurality of fingers. The respective fingers are allocated with the multi-path signals having different time delays through respective paths, and signals processed through the respective fingers are combined to heighten the receiving quality.

FIG. 1 is a block diagram illustrating an example of the construction of a conventional rake receiver used in the DS/CDMA mobile communication system.

Referring to FIG. 1, the rake receiver includes a searcher 120, a plurality of fingers 130, 140 and 150, a controller 110, and a combiner 160. The controller 110 manages the searcher 120, the fingers 130, 140 and 150, and the combiner 160. The searcher 120 detects power levels and position information of the multi-path signals. The respective fingers 130, 140 and 150 are allocated with a specified multi-path among the multi-paths from the controller 110, and each tracks its path and demodulates the multi-path signal received through the specified multi-path. The respective fingers 130, 140 and 150 include samplers 132, 142 and 152, code trackers 134, 144 and 154, and demodulators 136, 146 and 156, respectively. The combiner 160 receives demodulated symbol strings from the plurality of fingers 130, 140 and 150, and combines them into a single demodulated symbol string to output the single demodulated symbol string.

The operation of the rake receiver as constructed above will be explained. The controller 110 transfers a multi-path search command to the searcher 120. The searcher 120, which received the multi-path search command, measures the power levels of the multi-path signals. Then, the searcher 120 reports the position information of the multi-path signals to the controller 110 along with the measured power levels of the multi-path signals. The controller 110 receives the power levels and the position information of the multi-path signals from the searcher 120, and determines the multi-path signals required to be demodulated in accordance with the power levels and the position information. Then, the controller 110 allocates the fingers to the multi-path signals required to be demodulated, and outputs a demodulation command for requesting the demodulation of the corresponding multi-path signals to the allocated fingers. It is assumed that the allocation is performed with respect to the fingers 130, 140 and 150. The fingers 130, 140 and 150, which received the demodulation command, track the multi-path signals allocated to themselves, and demodulate the tracked multi-path signals. The demodulated symbol strings demodulated by the fingers 130, 140 and 150 are transferred to the combiner 160. Meanwhile, the fingers 130, 140 and 150 measure qualities of the multi-path signals which are now being demodulated, and report the measured qualities to the controller 110. The controller 110 determines whether to continue the demodulation of the specified multi-path signal using the qualities of the multi-path signals reported from the fingers 130, 140 and 150 and the power levels and the position information of the multi-path signals reported from the searcher 120. The combiner 160 combines the demodulated symbol strings transferred from the fingers 130, 140 and 150, and outputs a single demodulated symbol string resulting from the combining.

Hereinafter, the operation of the fingers which constitute the rake receiver will be explained in detail.

The code trackers 134, 144, and 154 search for the optimum sample positions so as to maximize the signal powers of the multi-path signals in synchronization with the multi-path signals. The optimum sample positions searched by the code trackers 134, 144 and 154 are provided to the samplers 132, 142 and 152 and the code trackers 134, 144 and 154, respectively, as timing control signals. The samplers 132, 142 and 152 sample the corresponding multi-path signals in accordance with the timing control signals from the code trackers 134, 144 and 154, and provide the sampled multi-path signals to the demodulators 136, 146 and 156 and the code trackers 134, 144 and 154. The demodulators 136, 146 and 156 demodulate the multi-path signals from the samplers 132, 142 and 152 using samples of the optimum sample positions detected by the code trackers 134, 144 and 154.

The code trackers 134, 144 and 154 search for the optimum sample positions using search windows of a predetermined size that corresponds to one sample. The search window can be expressed as a distance between the position of a late phase (hereinafter referred to as a "late hypothesis") and the position of an early phase (hereinafter referred to as an "early hypothesis"). The code trackers 134, 144 and 154 search for the optimum sample positions by moving the sample positions in a direction that a correlation value becomes larger using the search window, i.e., the difference between a correlation value of the late hypothesis and a correlation value of the early hypothesis. Generally, the time point where the difference between the correlation value of the late hypothesis and the correlation value of the early hypothesis is "0" corresponds to the optimum sample position. In performing the code tracking, the interval between the center axis of the search window and the late hypothesis or the interval between the center axis of the search window and the early hypothesis is set to be within one chip, and generally to be 0.5 chip. The converging positions of the code trackers 134, 144 and 154 depend upon power delay profiles of the multi-path signals.

In the multi-paths, as the time delay between the adjacent paths becomes greater and the power difference between the adjacent paths becomes smaller, the convergence of the respective path becomes easier. However, as the time delay between the adjacent paths gets smaller and the power difference between the adjacent paths becomes greater, the multi-path appears to be one path, and this causes the probability that the code trackers corresponding to the respective fingers converge to the same position to be increased. Several fingers tracking the same path is called a "fat finger phenomenon".

As described above, the respective fingers 130, 140 and 150 that constitute the rake receiver are allocated with the multi-paths having different time delays from the controller 110, and let the code trackers 134, 144 and 154 continuously track the multi-path signals received through the allocated multi-paths. The operation of the code tracker, the construction of which is illustrated in FIG. 2, will be explained in detail.

Referring to FIG. 2, an early-hypothesis correlator 210 obtains a sample position that is earlier than the position of a sample input to the demodulators, i.e., an early-hypothesis correlation, and outputs a first correlation value according to the correlation. A late-hypothesis correlator 212 obtains a sample position that is later than the position of a sample input to the demodulators, i.e., a late-hypothesis correlation, and outputs a second correlation value according to the correlation. The first correlation value and the second correlation value are subtracted by a subtracter 214, and a timing error is detected by the correlation difference according to the subtraction. The timing error passes through a loop filter 216 to be output as a timing control signal for obtaining the optimum sample position. The optimum sample position as obtained above depends upon an envelop of a power delay profile of a normal multi-path signal, and has a tendency to converge to a peak point of the envelop.

FIG. 3 is a graph illustrating an example of a power delay profile in the multi-path environment. In FIG. 3, paths $L_0$ and $L_1$, which have different time delays, have a time interval that is as long as $T_d$. It is assumed that under such a power delay profile, the paths $L_0$ and $L_1$ are allocated to different fingers, and $T_d$ is larger than one chip. Since the early-hypothesis correlation and the late-hypothesis correlation are not affected by other paths and thus are not greatly affected by noise, the code trackers of the respective fingers can continuously keep the synchronization with the respective paths.

FIG. 4 is a graph illustrating another example of a power delay profile in the multi-path environment. In FIG. 4, it is assumed that $T_d$ is smaller than one chip or the power difference between the adjacent paths is great. In this case, in the code tracker of the second finger which is allocated with the path $L_1$, the early-hypothesis correlation value becomes greater than the late-hypothesis correlation value. Accordingly, the timing control signal commands to move the search window in a direction where the correlation is great, i.e., in the direction of the path $L_0$. Through this operation, the two fingers, which were first allocated to the paths having the different time delays, converge to the path $L_0$ after a predetermined time elapses. This means that the fat finger phenomenon occurs, in which two different fingers track the same path.

The fat finger phenomenon occurring as above deteriorates the receiving performance of the rake receiver, the purpose of which is to obtain the time diversity effect by combining components of the multi-path signals having different delays.

As an example of the multi-path environment having the power delay profile as shown in FIG. 4, a case-3 channel may be cited among channel conditions presented in the technical specification (TS) that describes a terminal request performance with respect to a wideband CDMA (WCDMA) proposed in the $3^{rd}$ generation partnership project (3GPP). An impulse response of the case-3 channel has the characteristics as shown in Table 1 below. For reference, the period of one chip in the WCDMA system is $1/3840000$ sec (about 260 ns).

TABLE 1

| Relative Delay (ns) | Mean Power (dB) |
|---|---|
| 0 | 0 |
| 260 | −3 |
| 521 | −6 |
| 781 | −9 |

In the WCDMA system, a square raised cosine (SRRC) filter is used as a pulse shaping filter of the transmitting end and the receiving end. The impulse response characteristic according to the pulse shaping filter is shown in FIG. 5. Accordingly, an envelop $|\gamma(t)|$ of the impulse response r(t) of the signal received in a modem through the case-3 channel proposed in the TS and the pulse shaping filter is shown in FIG. 6. The envelop of FIG. 6 has the same characteristic as that of FIG. 4. Due to the above-described characteristics, the fat finger phenomenon occurs in the conventional multi-path receiver. In this case, the receiving performance request condition proposed in the 3GPP cannot be satisfied.

SUMMARY OF THE INVENTION

Accordingly, embodiments of the present invention have been made to solve the problems in the prior art, and an object of the present invention is to provide a rake receiving apparatus and method which can prevent the occurrence of a fat finger phenomenon.

Another object of the present invention is to provide an apparatus and method which can prevent time delay differences among a plurality of fingers allocated with adjacent paths from narrowing into a predetermined minimum reference time delay difference.

Still another object of the present invention is to provide an apparatus and method which can make a plurality of fingers refer to the same timing control signal if the time delay differences among the plurality of fingers allocated with adjacent paths reach a predetermined minimum reference time delay difference.

Still another object of the present invention is to provide an apparatus and method which can make a plurality of fingers refer to timing control signals generated internally if the time delay differences among the plurality of fingers, which refer to the same timing control signal, become larger than a predetermined threshold value.

Still another object of the present invention is to provide an apparatus and method which can make a plurality of fingers refer to timing control signals generated internally in accordance with a direction in which the time delay of the object finger moves if the time delay differences among the plurality of fingers, which refer to the same timing control signal, become larger than a predetermined threshold value.

Still another object of the present invention is to provide an apparatus and method which can prevent the time delay differences among a plurality of fingers allocated with different paths from narrowing into a predetermined error range.

In order to substantially accomplish these objects, there is provided an apparatus for making different fingers track multi-path signals allocated to the respective fingers in a rake receiving apparatus in which the respective fingers are allocated with the multi-path signals received through different paths and demodulate the multi-path signals allocated to the respective fingers. The apparatus comprises fingers, each receiving timing control signals generated from other fingers in order to track the allocated multi-path signals, and tracking the multi-path signal allocated to the corresponding finger by selecting any one of the timing control signals of other fingers and an internal timing control signal in accordance with code tracker selection signals, and a controller for receiving the timing control signals from the fingers, and outputting the code tracker selection signals corresponding to the respective fingers in accordance with differences among time delays being tracked by the fingers allocated with adjacent path signals.

In a second embodiment of the present invention, there is provided a method of making different fingers track multi-path signals allocated to the respective fingers in a rake receiving apparatus in which the respective fingers are allocated with the multi-path signals received through different paths and demodulate the multi-path signals allocated to the respective fingers. The method comprises the steps of outputting code tracker selection signals corresponding to the respective fingers in accordance with differences among time delays being tracked by the fingers allocated with adjacent path signals with reference to timing control signals generated from the respective fingers in order to track the allocated multi-path signals, the respective finger selecting any one of the timing control signals of other fingers and an internal timing control signal in accordance with the code tracker selection signals, and tracking the path signal allocated to the corresponding finger using the selected timing control signal.

In a third embodiment of the present invention, there is provided an apparatus for making different fingers track multi-path signals allocated to the respective fingers in a rake receiving apparatus in which the respective fingers are allocated with the multi-path signals received through different paths and demodulate the multi-path signals allocated to the respective fingers. The apparatus comprises a code tracker for generating an internal timing control signal for obtaining an optimum sample position from the allocated path signals, a timing control signal selector for receiving the internal timing control signal from the code tracker and the timing control signals from other fingers, and selecting and outputting any one of the internal timing control signal and the timing control signals from other fingers in accordance with a time delay difference between the finger allocated with the path signal and the finger allocated with an adjacent path signal, and a demodulator for demodulating the allocated path signal in accordance with the selected timing control signal.

In a fourth embodiment of the present invention, there is provided a method of making different fingers track multi-path signals allocated to the respective fingers in a rake receiving apparatus in which the respective fingers are allocated with the multi-path signals received through different paths and demodulate the multi-path signals allocated to the respective fingers. The method comprises the steps of generating an internal timing control signal for obtaining an optimum sample position from the allocated path signals, receiving the internal timing control signal and the timing control signals from other fingers, selecting and outputting any one of the internal timing control signal and the timing control signals from other fingers in accordance with a time delay difference between the finger allocated with the path signal and the finger allocated with an adjacent path signal, and demodulating the allocated path signal in accordance with the selected timing control signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
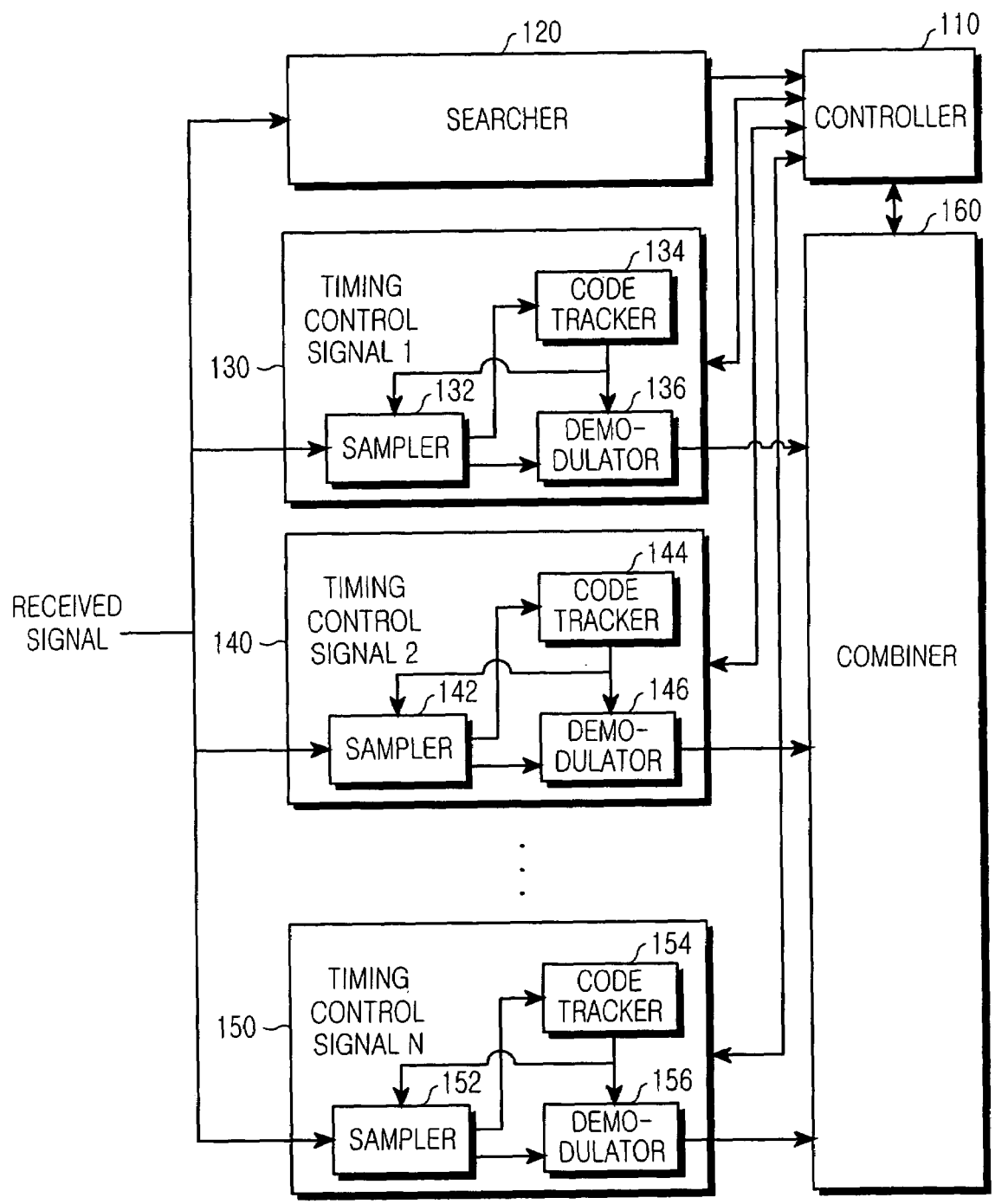
FIG. 1 is a block diagram illustrating an example of the construction of a conventional rake receiver.
Figure 2:
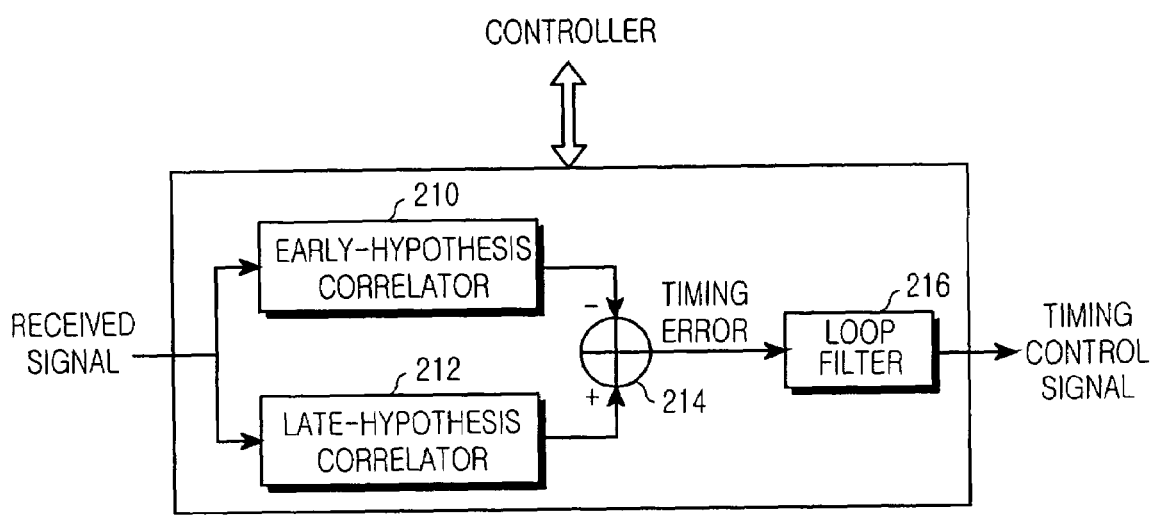
FIG. 2 is a block diagram illustrating an example of the construction of a general code tracker used in the conventional rake receiver.
Figure 3:
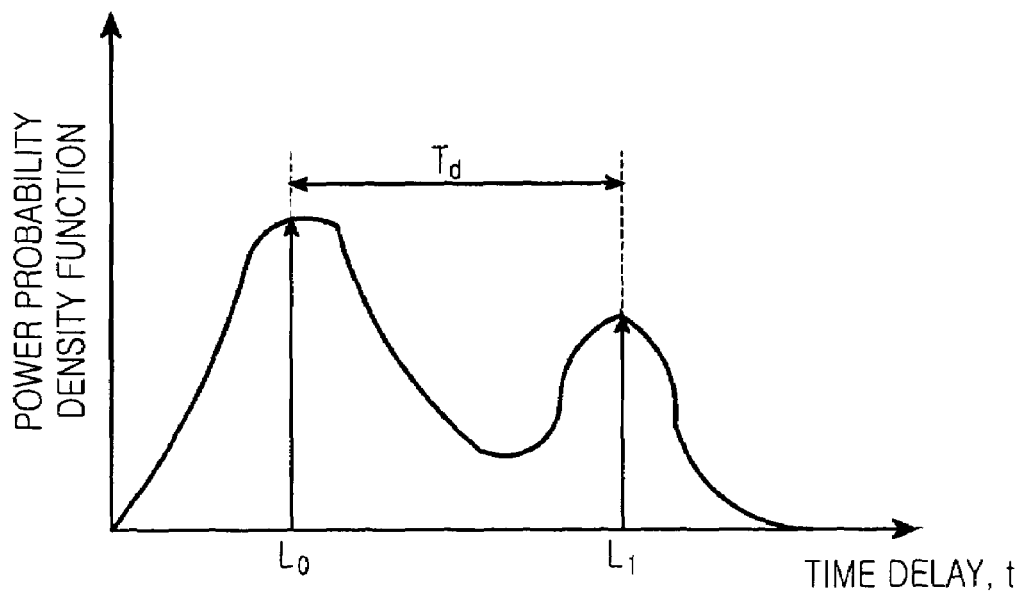
FIG. 3 is a graph illustrating an example of a power profile of a typical multi-path environment.
Figure 4:
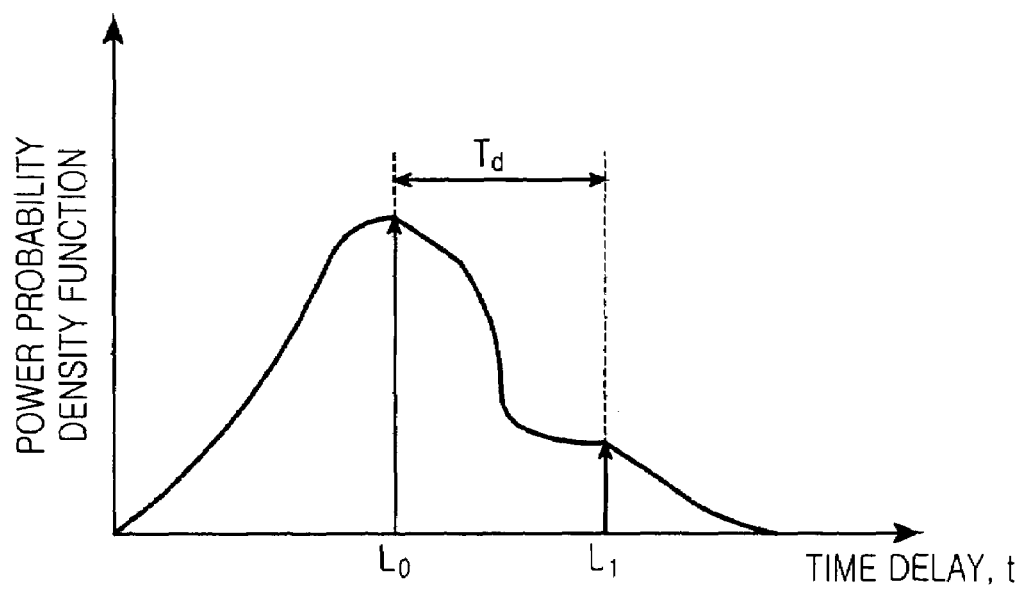
FIG. 4 is a graph illustrating another example of a power profile of a typical multi-path environment.
Figure 5:
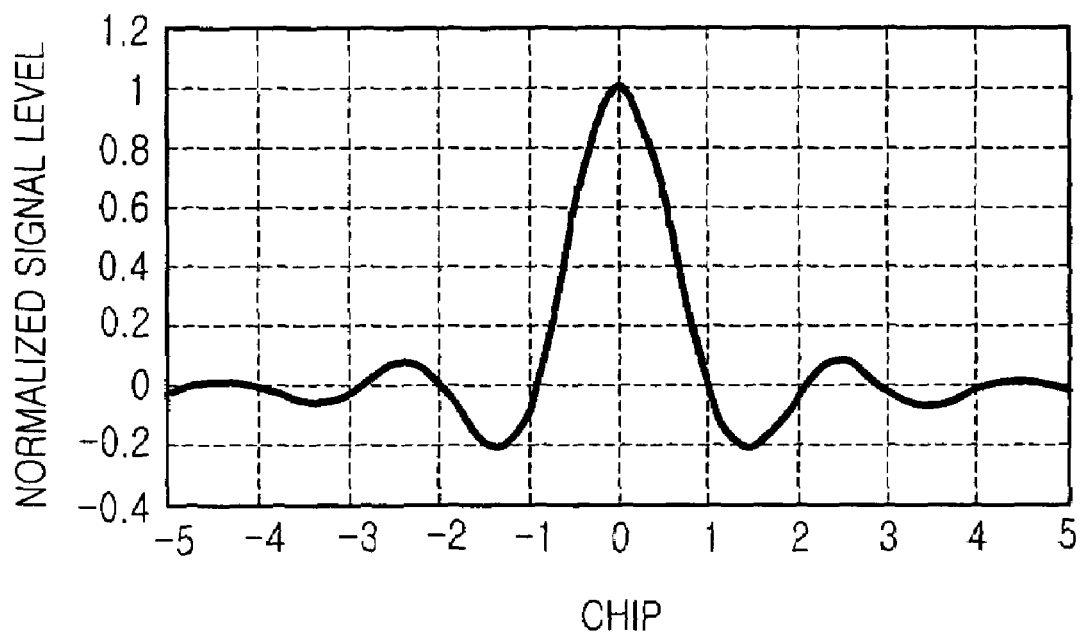
FIG. 5 is a graph illustrating an example of an impulse response by a pulse shaping filter in a transmitting/receiving end used in an asynchronous system.
Figure 6:
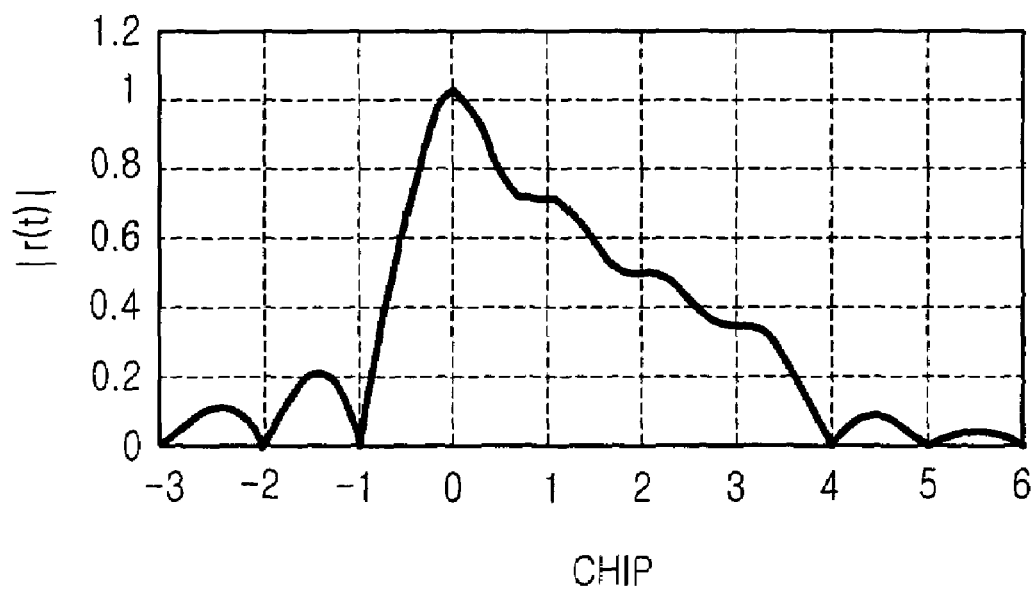
FIG. 6 is a graph illustrating an example of an envelop of a signal having passed through a case-2 channel proposed in an asynchronous system and a pulse shaping filter of a transmitting/receiving end.

Hereinafter, a rake receiving apparatus and method according to embodiments of the present invention will be described with reference to the accompanying drawings. In the following description of the present invention, a detailed description of known functions and configurations has been omitted for conciseness.

Typically, respective multi-path signals are received having different time delays. Accordingly, a rake receiver allocates the multi-path signals to a plurality of fingers and demodulates the multi-path signals having different time delays via the respective fingers. The respective finger moves to an optimum sample position where an optimum multi-path signal is received through the tracking of the allocated multi-path signal, and demodulates the multi-path signal received at the optimum sample position. The optimum sample position indicates the position of the time delay where the multi-path signal having the best power probability density function is received. The movement of the respective finger to the optimum sample position is performed by a timing control signal generated according to the tracking of the multi-path signal. That is, the timing control signal is a signal that controls the movement of the position of the time delay where the demodulation is presently performed. Accordingly, the time delay position, in which the demodulation of the multi-path signal allocated to the respective finger according to the timing control signal, is changed. In the embodiment of the present invention, the timing control signals from the respective fingers are collected, and the relationship among the positions of the time delays where the respective fingers intend to perform the demodulation is analyzed. If it is determined that the time delay position for a specified finger approaches the time delay position of the finger allocated with the adjacent multi-path as close as a threshold value (i.e., minimum reference time delay difference), the distance between the fingers is compulsorily kept to the threshold value. This can be effected by making the timing control signal of the finger allocated with the adjacent multi-path be equally used in the specified finger. In the following description, the finger allocated with the adjacent multi-path is called a "first finger", and the specified finger is called a "second finger".

In explaining the embodiment of the present invention in detail, terms to be used are first defined as follows:

$T_{th1}$: a threshold value (i.e., minimum reference time delay difference) which is the reference for judging whether the corresponding finger will use its own timing control signal or the timing control signal of another finger.

$T_{th2}$ and $T_{th3}$: threshold values (i.e., maximum reference time delay differences) which are the references for judging whether the finger, which is presently using the timing control signal of another finger, will use its own timing control signal or the timing control signal of another finger.

Movable range: a range formed by an error between $T_{th2}$ and $T_{th3}$.

$P_{th}$: a threshold value which is the reference for judging whether the finger, which is presently using the timing control signal of another finger, will use its own timing control signal even if the finger does not satisfy the condition of $T_{th3}$.

$T_d$: a time delay difference between two fingers (i.e., between adjacent paths for demodulation). In the case that a specified finger refers to the timing control signal of another finger, $T_d$ is fixed to $T_{th1}$.

$T_m$: a time delay difference between two fingers which apply the time delay positions changed by an internal code tracker in a state that the finger refers to the timing control signal of another finger.

$P_{hypo}$: a ratio of a late-hypothesis path power Plate and an early-hypothesis path power $P_{early}$ ($P_{early}/P_{late}$, or $P_{late}/P_{early}$) or a difference between the late-hypothesis path power $P_{late}$ and the early-hypothesis path power $P_{early}$ ($P_{early}-P_{late}$, or $P_{late}-P_{early}$). That is, of the early hypothesis and the late hypothesis of the internal code tracker, the ratio of the power level of the hypothesis in a direction where $T_m$ increases and the power level of the hypothesis in the direction where $T_m$ decreases.

Timing control signal: a control signal for moving the time delay position of the corresponding path in performing the tracking operation of the allocated path in the respective finger. That is, the time delay position, which is the time point where the respective finger performs the demodulation, moves to the late-hypothesis side or the early-hypothesis side by the timing control signal.

Hereinafter, the rake receiving apparatus and the control method thereof for determining the timing control signals to be used in the respective fingers and demodulating the allocated multi-path signals by the determined timing control signals will be explained in detail.

Figure 7:
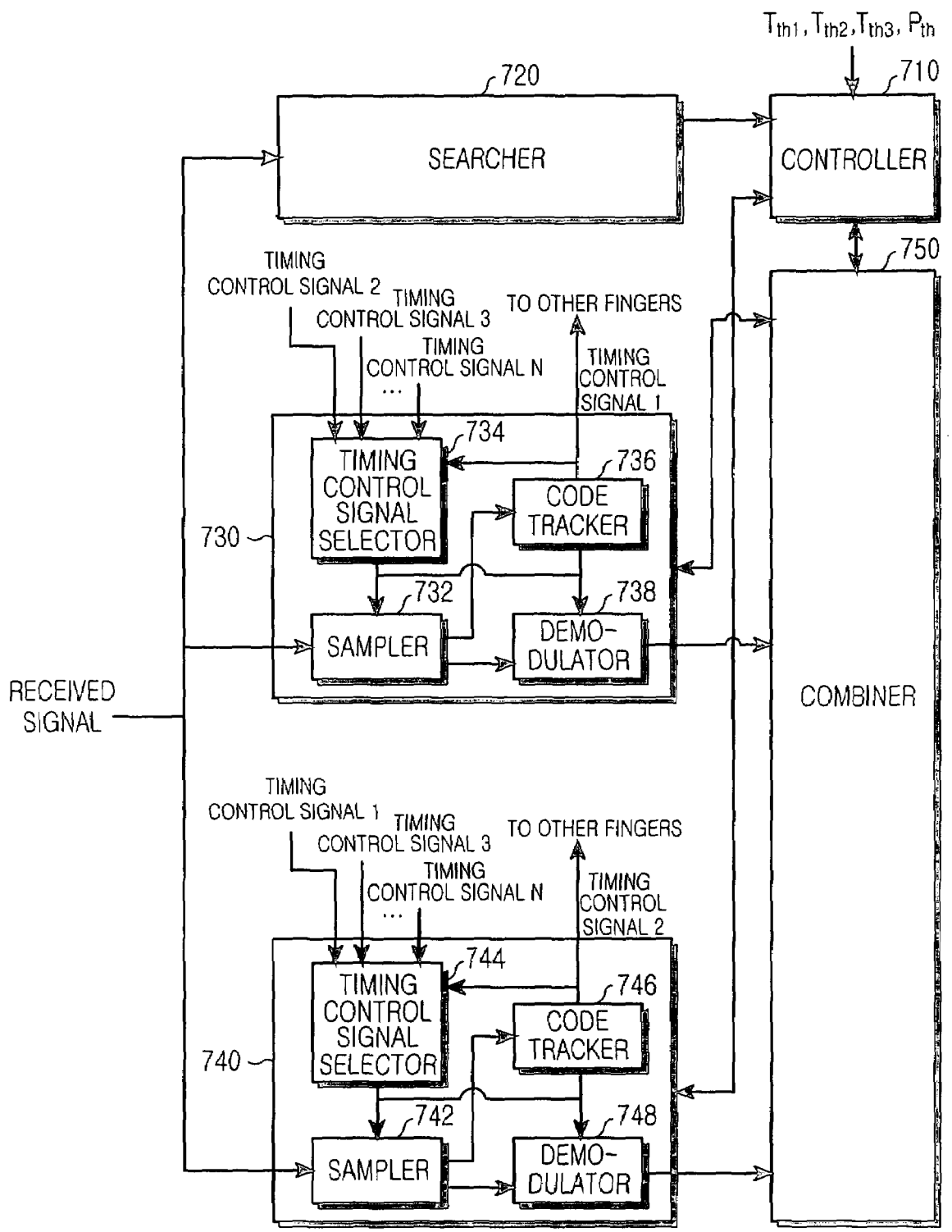
FIG. 7 is a block diagram illustrating an example of the construction of a rake receiver according to an embodiment of the present invention.

FIG. 7 is a block diagram illustrating an example of the construction of the rake receiver according to an embodiment of the present invention. As shown in FIG. 7, in order to demodulate multi-path signals according to the embodiment of the present invention, it is required for the respective finger to receive the timing control signals from other fingers. Also, the respective finger should select any one of the timing control signals from other fingers or its own timing control signal through a specified procedure.

The operation of the rake receiver as constructed above according to the present invention will be explained with reference to FIG. 7. A controller 710 commands a searcher 720 to search for multi-paths. The searcher 720, which received the multi-path search command, measures power levels of multi-path signals. Then, the searcher 720 reports position information of the multi-path signals and the measured power levels to the controller 710. The controller 710 receives the power levels and the position information of the multi-path signals from the searcher 720, and determines the multi-path signals required to be demodulated in accordance with the power levels and the position information. Then, the controller 710 allocates the inherent fingers to the multi-path signals required to be demodulated, and outputs an initial demodulation command for requesting the demodulation of the multi-path signals to the allocated fingers.

The fingers 730 and 740, which received the initial demodulation command, track the multi-path signals allocated to themselves, and demodulate the tracked multi-path signals. The demodulated symbol strings demodulated by the fingers 730 and 740 are transferred to a combiner 750. The fingers 730 and 740 measure qualities of the multi-path signals which are now being demodulated, and report the measured qualities to the controller 710. The fingers 730 and 740 generate internal timing control signals in accordance with the tracking of the allocated multi-path signals through code trackers 736 and 746. That is, the code trackers 736 and 746 search for the optimum sample positions using a search window having a predetermined size corresponding to one sample. The search window may be expressed as a distance between a late hypothesis and an early hypothesis. The code trackers 736 and 746 output timing control signals for moving sample positions in such a direction that a correlation value becomes larger using the difference between a correlation value of the late hypothesis and a correlation value of the early hypothesis. Generally, the optimum sample position is the time point where the difference between the correlation value of the late hypothesis and the correlation value of the early hypothesis becomes "0". The timing control signals generated from the code trackers 736 and 746 are reported to the controller 710. Meanwhile, the timing control signals are provided not only to its own timing control signal selector but also to timing control signal selectors of other fingers. Accordingly, the respective fingers 730 and 740 can recognize all the timing control signals internally generated by the remaining fingers.

The controller 710 receives the timing control signals from the respective fingers. The controller 710 determines the timing control signals to be used by the allocated fingers by the timing control signals and externally provided threshold values $T_{th1}$, $T_{th2}$, $T_{th3}$ and $P_{th}$. That is, the controller 710 determines whether to have the respective fingers use their own timing control signals or the timing control signals of other fingers. The controller 710 outputs the code tracker selection signal for selecting the determined timing control signal along with the demodulation command. The demodulation command at this time is to request to continue the presently performed demodulation operation. For example, the controller 710 prevents the interval between the path tracked by a specified finger and the path tracked by another path from approaching within $T_{th1}$. The operation of the controller 710 according to the embodiment of the present invention will be explained later with reference to FIG. 9.

Figure 8:
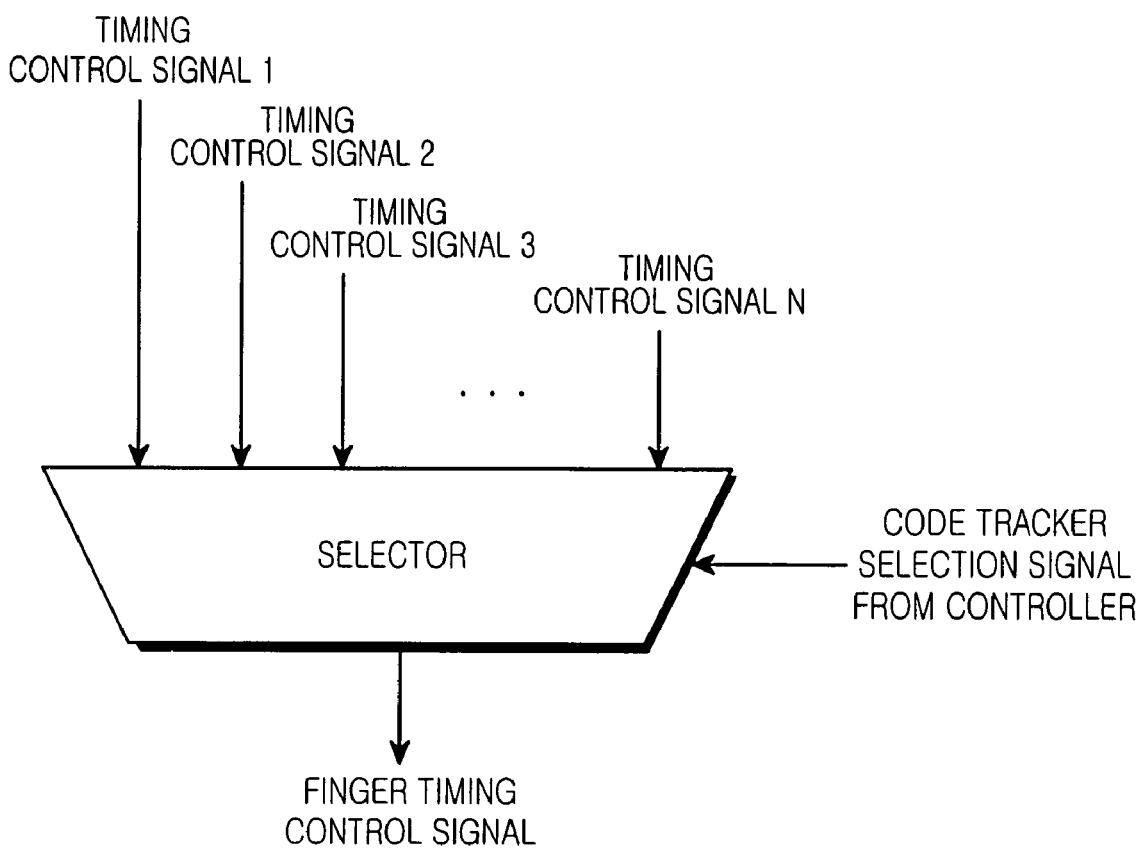
FIG. 8 is a block diagram illustrating an example of the detailed construction of a timing control signal selector illustrated in FIG. 7.

The fingers 730 and 740 select any one of their own timing control signals and the timing control signals from the pre-known remaining fingers in accordance with the code tracker selection signal from the controller 710. The selection of the timing control signal is performed by timing control signal selectors 734 and 744 of the respective fingers 730 and 740. The timing control signal selector 734 or 744 is implemented as shown in FIG. 8. As shown in FIG. 8, the timing control signal selector receives the timing control signal from the code tracker of the finger to which the timing control signal selector belongs and the timing control signals from the code trackers of other fingers. In FIG. 8, N timing control signals are input to the timing control signal selector as an example. The N timing control signals include the timing control signal input from the code tracker of the finger to which the timing control signal selector belongs. Meanwhile, the timing control signal selector receives the code tracker selection signal from the controller 710, and selects one of the timing control signals in accordance with the code tracker selection signals. The selected timing control signal is output as the timing control signal of the corresponding finger.

Thereafter, the respective fingers continue the demodulation of the multi-path signals in accordance with a newly selected timing control signal. However, the fingers 730 and 740 continuously output their own timing control signals even if they demodulate the multi-path signals in accordance with the timing control signals from other fingers. That is, even if the internal code tracker is not referred to by its own finger, the operation of the internal code tracker is not stopped, but is continuously performed. This is for selecting the use of its timing control signal anytime through the controller 710 when the time delay difference between the adjacent paths becomes great. Accordingly, the time delay difference where the demodulation is performed by the corresponding finger cannot move in the direction where $Td < T_{th1}$, but is allowed to move only in the direction where $Td \geq T_{th1}$.

The timing control signals selected by the timing control signal selectors 734 and 744 are provided to corresponding samplers 732 and 742 and demodulators 738 and 748. The samplers 732 and 742 and the demodulators 738 and 748 demodulate the desired multi-path signals in accordance with the timing control signals. Meanwhile, the demodulated symbol strings output from the respective fingers through the above-described operation are input to a combiner 750. The combiner 750 combines the demodulated symbol strings and output a single demodulated symbol string. This heightens the receiving quality of the multi-path signal.

Figure 9:
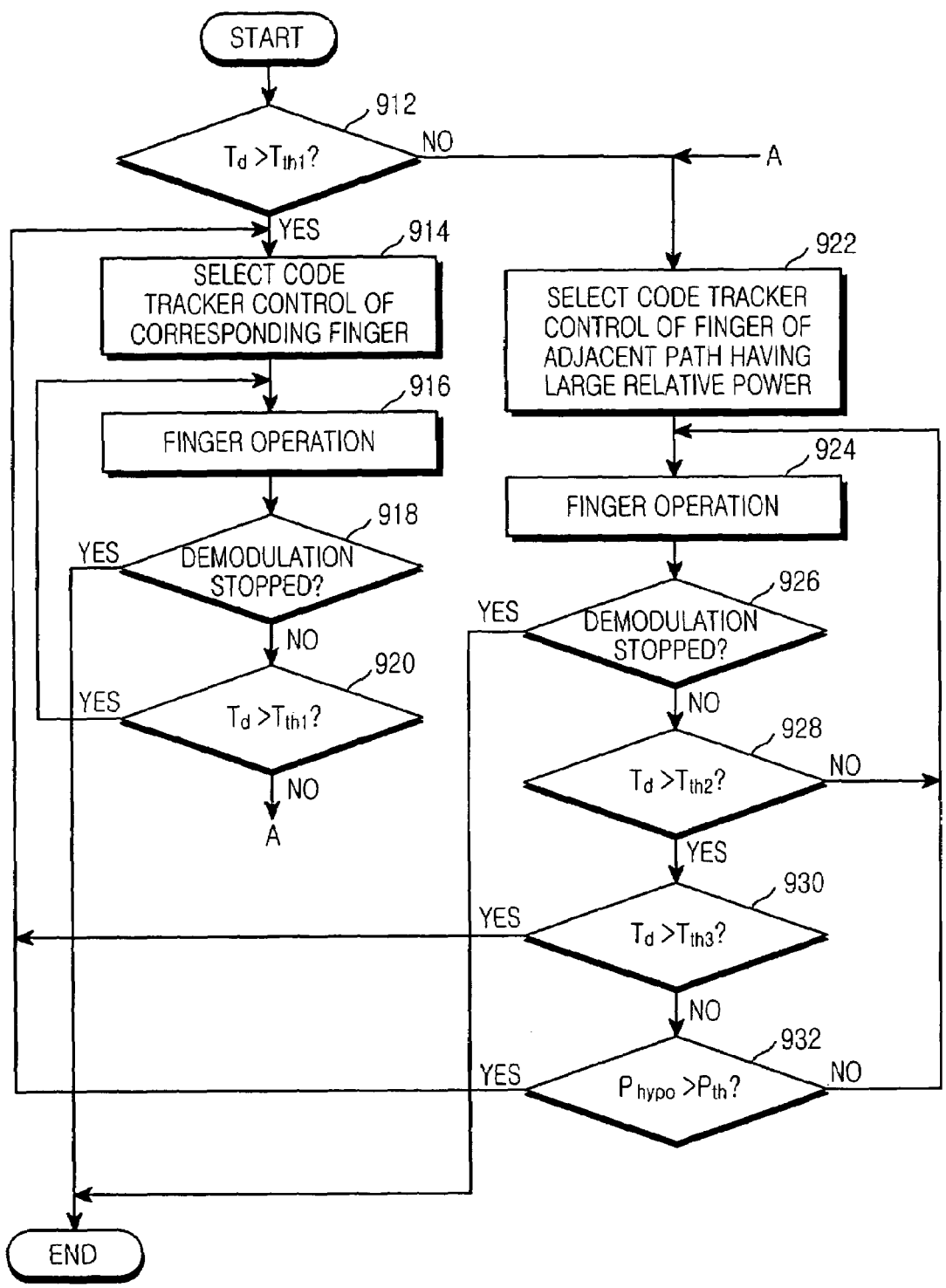
FIG. 9 is a flow chart illustrating an example of a control flow for a multi-path reception according to an embodiment of the present invention.

FIG. 9 is a flow chart illustrating an example of a control flow in the rake receiver according to an embodiment of the present invention. The control flow of FIG. 9 includes a procedure of selecting one timing control signal corresponding to a specified finger among the timing control signals from the respective fingers. In the control flow as shown in FIG. 9, it is assumed that threshold values $T_{th1}$, $T_{th2}$, $T_{th3}$ and $P_{th}$ have already been received from an outside, and timing control signals from the respective fingers have been collected.

The control flow as shown in FIG. 9 includes the steps of, if the demodulation operation is requested with respect to the multi-path signals, the controller calculating the time delay difference $T_d$ between a target path and an adjacent path nearest to the target path while the demodulation is effective, if an occurrence of a fat finger phenomenon is not estimated by the calculated time delay difference $T_d$, keeping the corresponding finger continuously referring to its own code tracker, and otherwise, controlling so that the remaining finger refers to the code tracker of the finger allocated with the path having a larger power between the target path and the adjacent path.

Referring to FIG. 9, the controller 710 confirms the paths being demodulated by the respective fingers, i.e., the intervals $T_d$ among the time delay positions where the demodulation is performed, in accordance with the timing control signals from the respective fingers. Then, the control operation is performed for the respective intervals. In the description to be explained later, only the interval $T_d$ confirmed between the two specified fingers (i.e., two fingers to which the allocated multi-paths are adjacent) among the intervals will be explained, but it should be noted that the control can be performed in the same manner with respect to the intervals among all the fingers. The two fingers having the interval $T_d$ may be the "first finger" and the "second finger" as previously defined.

At step 912, the controller 710 of the rake receiver determines whether the intervals $T_d$ among the confirmed time delay positions reach the predetermined threshold value $T_{th1}$. This can be performed by determining whether the intervals $T_d$ among the confirmed time delay positions satisfy the condition of "$T_d > T_{th1}$". If the condition is not satisfied, it means that the time delay position where the demodulation is performed by the second finger has approached the time delay position where the demodulation is performed by the first finger to an extent that the fat finger phenomenon occurs. This means that if a proper control is not performed, the fat finger phenomenon may occur between the first finger and the second finger.

The use of the threshold value $T_{th1}$ on the above-described condition will be explained in more detail. Generally, the autocorrelation of the direct sequence diffusion code is relatively large when the time difference is below one chip, while it is zero or relatively small according to the characteristic of the pulse shaping filter when the time difference is above one chip. Accordingly, if $T_{th1}$ is set to one chip, the time delay difference between paths cannot be below one chip, and thus a cross-interference between paths, i.e., unwanted autocorrelation of the diffusion code, can be suppressed.

If it is checked that $T_d$ satisfies the above condition, the controller proceeds to step 914, while if it is checked that does not satisfy the above condition, the controller proceeds to step 922. At step 914, the controller 710 output the code tracker selection signal for commanding the first finger and the second finger to continuously perform the tracking of the multi-path signals in accordance with the internal timing control signals. In response to this, the first finger and the second finger continuously perform the demodulation and the tracking of the corresponding multi-path signals in accordance with the internally generated timing control signals at step 916. At step 918, the controller 710 continuously checks whether the demodulation is stopped. This is for judging whether to continuously perform the demodulation with respect to the present path signals on the ground that the signal powers of the paths, which are presently demodulated, become weak, or the multi-path searcher finds and allocates a new path to the finger. If it is detected that the demodulation is stopped at step 918, the controller 710 sends a command to stop the demodulation to the object fingers. If it is detected that the demodulation is not stopped, the controller 710 re-performs the checking performed at step 912 (step 920). This is because the condition of $T_d > T_{th1}$, which was checked at step 912, may not be satisfied while the first finger and the second finger perform the demodulation. If the condition is not satisfied at step 920, the controller proceeds to step 922.

In summary, the controller proceeds from step 912 to step 922 if the initial time delay position of the first finger and the initial time delay position of the second finger do not satisfy the above-described condition. The controller proceeds from step 920 to step 922 if the above-described condition is not satisfied in a state that the first finger and the second finger perform the demodulation of the multi-path signals already allocated.

At step 922, the controller 710 compares the path power of the multi-path signal allocated to the first finger with the path power of the multi-path signal allocated to the second finger, and has the finger having a relatively small path power refer to the timing control signal of the finger having a relatively large path power according to the result of comparison. For example, if the path power of the multi-path signal allocated to the first finger is larger than the path power of the multi-path signal allocated to the second finger, the second finger will refer to the timing control signal of the first finger. In the following description, it is assumed that the second finger refers to the timing control signal of the first finger. Accordingly, the controller 710 outputs the code tracker selection signal for commanding the second finger to select the timing control signal provided from the first finger at step 922. Meanwhile, the controller outputs the code tracker selection signal for commanding the first finger to select the internally generated timing control signal.

In response to this, the first finger continuously performs the finger operation in accordance with the internally generated timing control signal at step 924. Meanwhile, at step 924, the second finger selects the timing control signal provided from the first finger, and performs the finger operation in accordance with the selected timing control signal. Accordingly, the time delay position, i.e., the path position, of the second finger moves by the time delay position, i.e., the path position, of the first finger. For example, if the path position of the first finger moves to approach the path position of the second finger (i.e., in the direction where $T_m < T_{th1}$), the path position of the second finger moves in the same manner in order to keep the state of "$T_d = T_{th1}$".

The controller 710 continuously monitors whether the demodulation is stopped at step 926. If it is detected that the demodulation is stopped at step 926, the controller 710 transmits a command for stopping the demodulation to the object fingers. If it is detected that the demodulation is not stopped, the controller 710 determines whether the time delay position in accordance with the timing control signals reported from the second finger escapes from the position where the fat finger phenomenon can occur. For this judgment, a predetermined threshold value $T_{th2}$ is used. Specifically, this judgment is performed by checking whether the time delay difference $T_m$ between the time delay position according to the timing control signal reported by the first finger and the time delay position according to the timing control signal reported by the second finger is larger than $T_{th2}$ in a state that the timing control signal from the first finger is referred to. That is, the condition applied to the judgment is "$T_m > T_{th2}$". $T_{th2}$ should satisfy the condition of "$T_{th1} \leq T_{th2} \leq T_{th3}$". If the condition of "$T_m > T_{th2}$" is not satisfied at step 928, the controller 710 controls so that the finger operation is continuously performed at step 924. However, if the condition is satisfied at step 928, the controller 710 proceeds to step 930, and determines whether the timing control signal that the second finger will refer to can be changed. In the present invention, the step 930 is for preventing the timing control signal to which a specified finger must refer to from being frequently changed.

If it is determined that $T_m$ is larger than $T_{th3}$ through steps 928 and 930, the controller 710 proceeds to step 914, and outputs the code tracker selection signal for making the second finger refer to the timing control signal internally generated because the time delay position according to the timing control signal generated in the second finger completely escapes from the position where the fat finger phenomenon may occur.

By contrast, if $T_m$ is larger than $T_{th2}$, but smaller than or equal to $T_{th3}$, the controller 710 proceeds to step 932. $T_{th3}$ may correspond to the time delay difference determined as the interference between two adjacent paths is insignificant, or may be the maximum time delay difference allowed in the sample position used for the demodulation and path tracking in the same finger in the case of hardware implementation.

The controller 710, which proceeded to step 932, compares $P_{hypo}$ and $P_{th}$, and if $P_{hypo}$ is larger than $P_{th}$ as a result of comparison, it proceeds to step 914. However, if $P_{hypo}$ is smaller than or equal to $P_{th}$, the controller controls so that the finger operation can continuously be performed at step 924. In operation, as $P_{th}$ is set to a higher value, the probability that the selection of the code tracker of the finger is changed is lowered. This is for preventing the selection of the code tracker of the finger from being frequently changed.

By applying the above-described embodiment, in a period where a specified finger refers to the timing control signal from an adjacent finger, the time delay difference between the time delay position of the path where the specified finger performs the demodulation and the time delay position of the path where the adjacent finger performs the demodulation is kept $T_{th1}$. Accordingly, the fat finger phenomenon is prevented from occurring between the specified finger and the adjacent finger.

Thereafter, if the time delay position of the path where the specified finger performs the demodulation becomes far from the time delay position of the path where the adjacent finger performs the demodulation, the controller has the specified finger refer to the timing control signal internally generated, so that the specified finger operates independently.

FIGS. 10 to 14 illustrate examples of the multi-path receiving operation for the understanding of the present invention.

Figure 10:
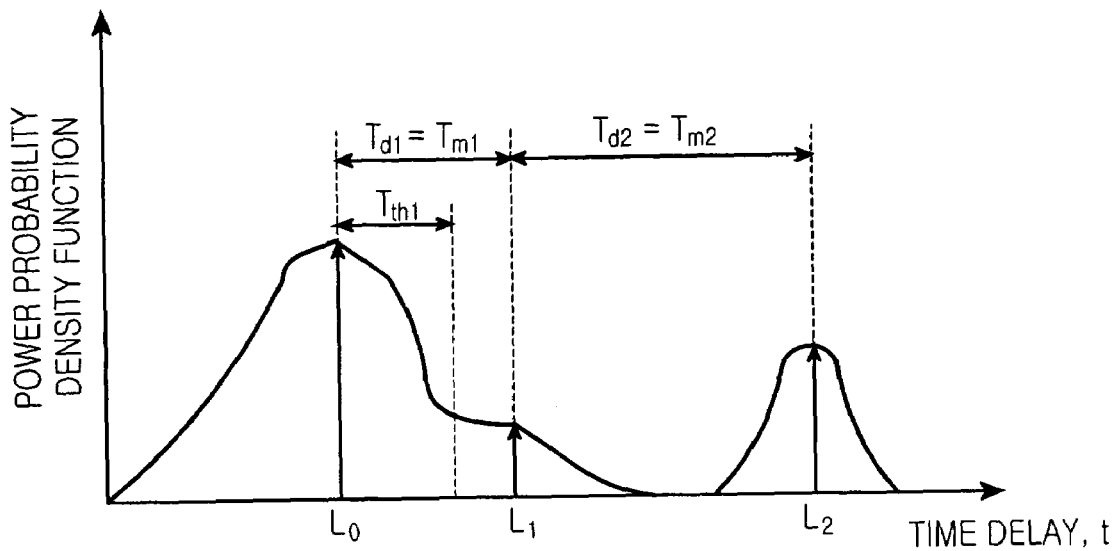
FIG. 10 is a waveform diagram illustrating a first example of the operation the rake receiver according to an embodiment of the present invention.

FIG. 10 illustrates an initial state that the fingers are allocated to the respective paths by the controller. In FIG. 10, it is assumed that three paths $L_0$, $L_1$ and $L_2$ having different time delays are allocated to three different fingers, i.e., first to third fingers, respectively, by the controller. Also, it is assumed that if the time delay difference between the paths $L_0$ and $L_1$ is $T_{d1}$, and the time delay difference between the paths $L_1$ and $L_2$ is $T_{d2}$, $T_{th1} < T_{d1}(=T_{m1}) \leq T_{d2}$.

On the above-described assumption, code trackers, which are referred to by the respective fingers allocated with different paths are described in Table 2 below.

TABLE 2

| Object Finger | Code Tracker to be Controlled |
|---|---|
| First Finger | First Code Tracker |
| Second Finger | Second Code Tracker |
| Third Finger | Third Code Tracker |

As shown in Table 2, it can be recognized that the respective fingers, i.e., first to third fingers, are controlled by the internal code trackers, respectively. The fact that the fingers are controlled by the internal code trackers means that the corresponding paths are tracked by the timing control signals generated from the respective code trackers. Typically, the code tracker is apt to converge to a place where the peak level of the signal is positioned according to the envelop of the power delay profile of the received signal. Accordingly, the code tracker of the second finger allocated with the path $L_1$ will generate the timing control signal for moving the path to be tracked by the corresponding code tracker in a direction of the path $L_0$.

Figure 11:
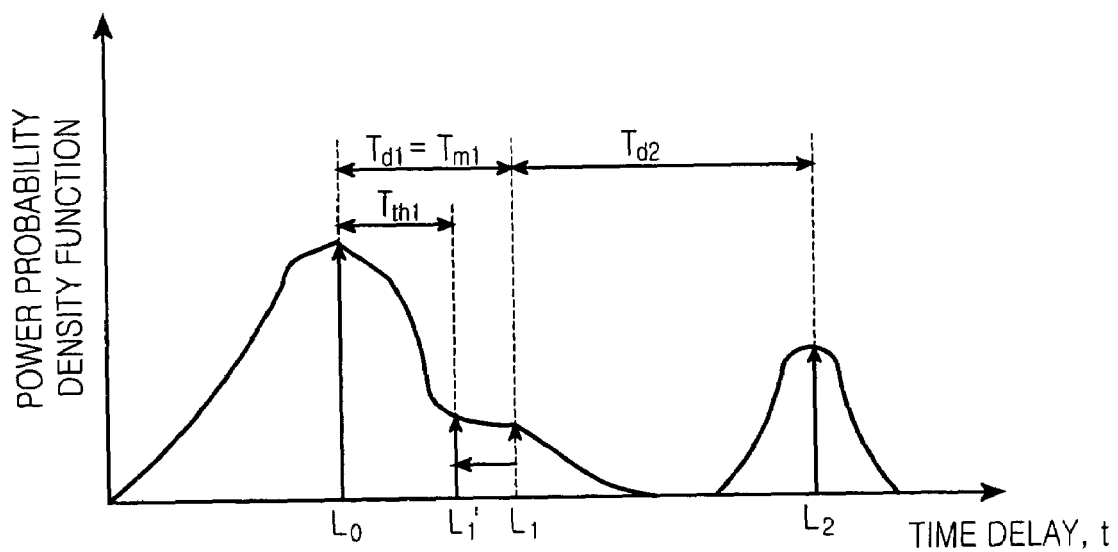
FIG. 11 is a waveform diagram illustrating a second example of the operation the rake receiver according to an embodiment of the present invention.

FIG. 11 is a graph illustrating an example where the tracking path of the second finger has moved based on the timing control signal generated from the code tracker of the second finger of FIG. 10. In FIG. 11, the path being tracked by the second finger moves from the path $L_1$ initially allocated to the path $L_1'$ according to the timing control signal generated from the internal code tracker, and thus $T_{d1}$ ($=T_{m1}$) reaches $T_{th1}$. The timing control signal provided from the code tracker, which is for requesting the movement of the tracking path of the second finger from the path $L_1$ to the path $L_1'$ will be reported to the controller. The controller confirms that $T_{d1}$, reached $T_{th1}$ in accordance with the timing control signal reported from the second finger and the timing control signal reported from the first finger. Thereafter, the controller compares
the power level of the path tracked by the first finger with the power level of the path tracked by the second finger. In accordance with a result of the comparison, the controller provides the second finger with the code tracker selection signal for making the finger (which is demodulating the path $L_1'$ as shown in FIG. 11) corresponding to the relatively low power level not follow the timing control signal generated from its own code tracker, but follow the timing control signal generated from the code tracker of the finger (which is demodulating the path $L_0$ as shown in FIG. 11) corresponding to the relatively high power level. The second finger selects and uses the timing control signal provided from the first finger among the timing control signal internally generated and the timing control signals from other fingers in accordance with the code tracker selection signal.

In the above-described example, the code trackers which are referred to by the respective fingers allocated with different paths are shown in Table 3 below.

TABLE 3

| Object Finger | Code Tracker to be Controlled |
|---|---|
| First Finger | First Code Tracker |
| Second Finger | First Code Tracker |
| Third Finger | Third Code Tracker |

As shown in Table 3, the second finger does not follow the timing control of its own code tracker, but is under the timing control of the code tracker of the first finger. This is for preventing the fat finger phenomenon that may occur if the time delay difference is small and the power difference is large in the multi-path environment. That is, since the finger that is under the timing control of the code tracker of another finger keeps a constant time delay difference $T_{th1}$ from the referring finger, there is no possibility that the fingers track the same path. $T_{th1}$ is a maximum allowable time difference between paths where the demodulation is performed by two fingers, and serves to prevent the generation of the fat finger phenomenon.

Meanwhile, the code tracker of the second finger that modulates the path $L_1'$, even though it is not referred to by its own finger, continues to perform the path tracking operation for itself without stopping its operation. However, it cannot move in the direction where $T_{m1} < T_{th1}$, but is allowed to move only in the direction where $T_{m1} \geq T_{th1}$. This is for returning to the operation under the control of the internal code tracker when the time delay difference between the adjacent paths becomes greater again.

The channel environment of the mobile communication system is not fixed, but changes according to time, and this may cause the power delay profile of the multi-path to change. Hereinafter, several examples, which may occur when the second finger refers to the timing control signal of the first finger, will be explained with reference to FIGS. 12 to 14.

Figure 12:
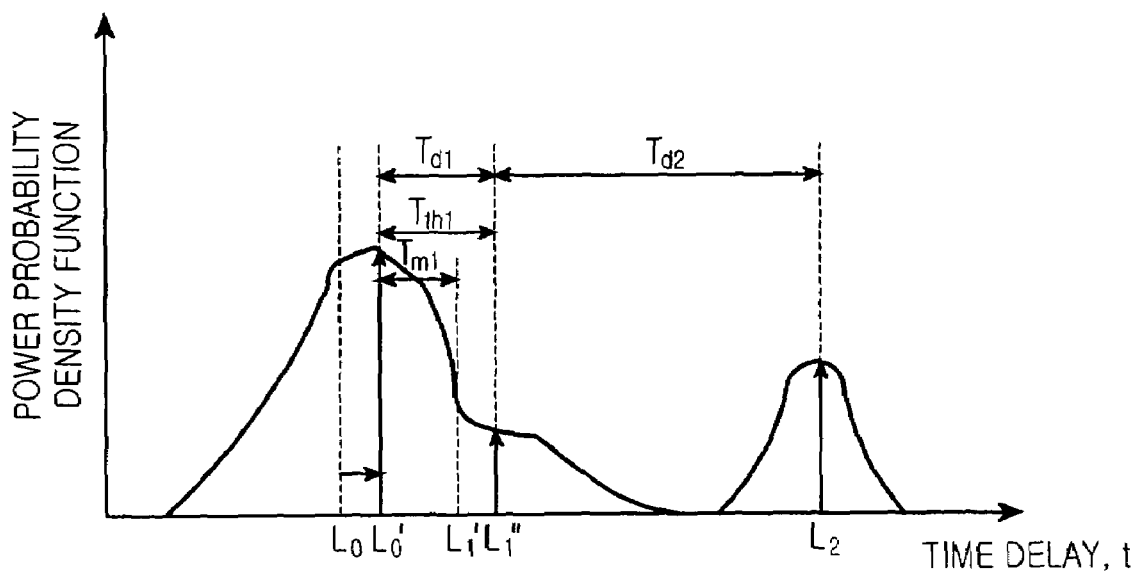
FIG. 12 is a waveform diagram illustrating a third example of the operation the rake receiver according to an embodiment of the present invention.

FIG. 12 is a graph illustrating an example where the path tracked by the first finger has moved when the paths tracked by the first finger and the second finger keep a constant time delay difference $T_{th1}$. In FIG. 12, it is assumed that the time delay corresponding to the path tracked by the first finger moves from $L_0$ to $L_0'$, and the timing control signal generated from the code tracker of the second finger is not changed. In this case, the second finger refers to the timing control signal from the first finger, and thus by moving the time delay corresponding to the path tracked by itself from $L_1'$ to $L_1''$, it can secure the time delay difference $T_{d1}$ between the first finger and the second finger as the minimum allowable time delay difference $T_{th1}$. Needless to say, it is not necessary to move the time delay if the time delay difference $T_{m1}$ is more than $T_{th1}$. However, since it is assumed that the path that the code tracker of the second finger follows is fixed in FIG. 12, the time delay corresponding to the path tracked by the second finger moves.

Figure 13:
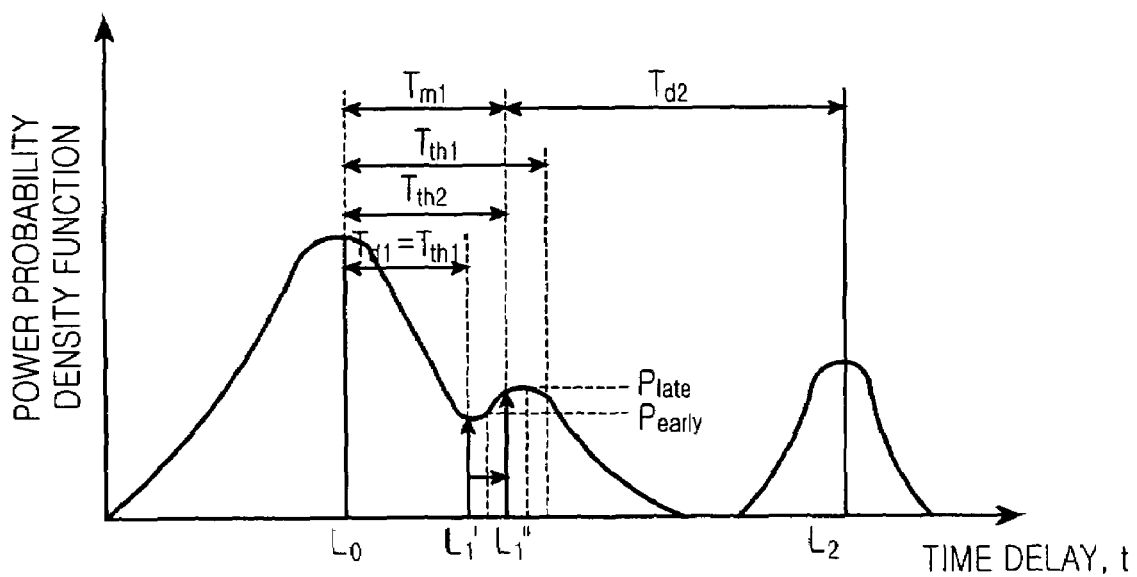
FIG. 13 is a waveform diagram illustrating a fourth example of the operation the rake receiver according to an embodiment of the present invention.
Figure 14:
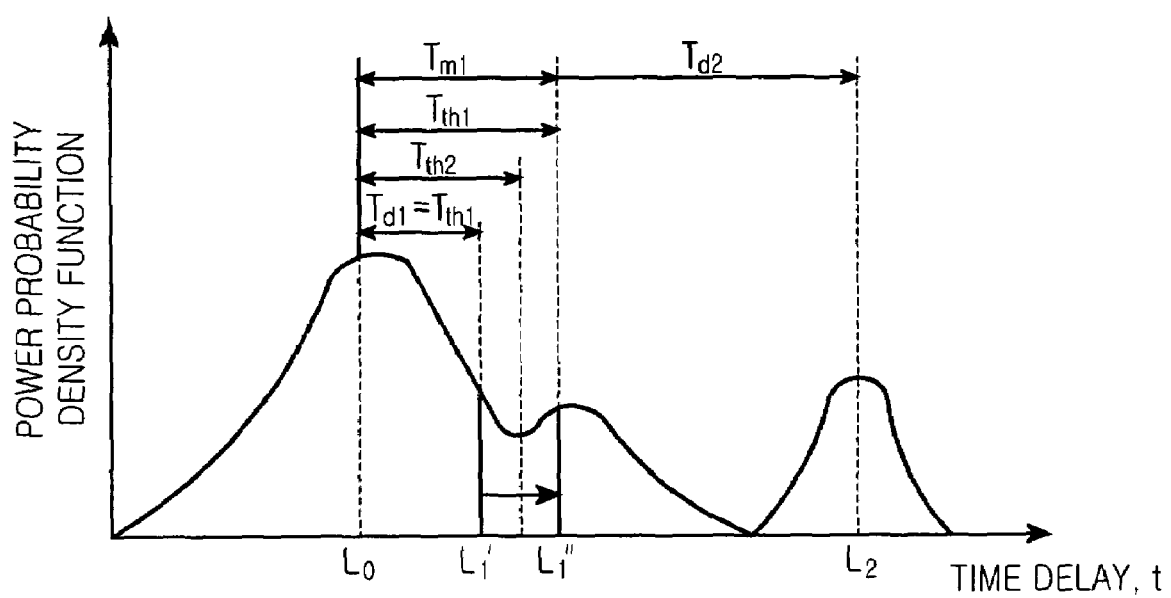
FIG. 14 is a waveform diagram illustrating a fifth example of the operation the rake receiver according to an embodiment of the present invention.

FIGS. 13 and 14 illustrate states that the finger, which referred to the timing control signal of another finger as in FIG. 11, refers again to the timing control signal generated from its own code tracker.

FIG. 13 is a graph illustrating an example where the path which is not referred to by the second finger, but is tracked by the internal code tracker has moved when the paths tracked by the first finger and the second finger keep a constant time delay difference $T_{th1}$. In FIG. 13, it is assumed that the time delay corresponding to the path tracked by the code tracker of the second finger moves from $L_1'$ to $L_1''$, and the timing control signal generated from the code tracker of the first finger is not changed. The timing control signal generated from the code tracker of the second finger is reported to the controller. The controller confirms that the time delay internally tracked by the timing control signal reported from the second finger moved from $L_1'$ to $L_1''$. Thereafter, the controller determines whether $T_{m1}$ reaches a predetermined threshold value $T_{th2}$ by comparing the time delay difference $T_{m1}$ from the time delay $L_0$ tracked by the first finger with $T_{th2}$. If it is determined that $T_{m1}$ exceeds $T_{th2}$, the controller determines whether $T_{m1}$ reaches $T_{th3}$ by additionally comparing $T_{m1}$ with $T_{th3}$. If it is determined that $T_{m1}$ does not reach $T_{th3}$, the controller analyzes the early-hypothesis path power $P_{early}$ and the late-hypothesis path power $P_{late}$ on the basis of $L_1''$. Thereafter, the controller confirms whether the movement is in the direction where the path power increases by comparing $P_{hypo}$ with a predetermined threshold value $P_{th}$. It is assumed that the movement in the direction where the path power increases corresponds to the condition that $P_{hypo}$ becomes larger than $P_{th}$ ($P_{hypo} \geq P_{th}$). As described above, it is for preventing the generation of an unnecessary control that the controller determines whether $T_{m1}$ reaches $T_{th3}$ and confirms that $P_{hypo}$ becomes larger than $P_{th}$. That is, the above operation is to properly cope with the situation that $T_{m1}$ frequently changes between $T_{th1}$ and $T_{th2}$.

The controller outputs a code tracker selection signal for instructing the second finger to refer to the timing control signal internally generated if $T_{m1}$ exists between $T_{th2}$ and $T_{th3}$, or $T_{m1}$, exists between $T_{th2}$ and $P_{hypo}$ is larger than or equal to $P_{th}$. The second finger selects and uses the timing control signal internally generated among the internally generated timing control signal and the timing control signals from other fingers in accordance with the code tracker selection signal.

Meanwhile, if $T_{m1}$ exists between $T_{th2}$ and $T_{th3}$, but $P_{hypo}$ is not larger than or equal to $P_{th}$, the controller outputs a code tracker selection signal for instructing the second finger to continuously refer to the timing control signal from the first finger. In this case, the second finger demodulates the corresponding path signal by continuously using the timing control signal of the first finger being presently referred to.

FIG. 14 is a graph illustrating another example where the path which is not referred to by the second finger, but is tracked by the internal code tracker has moved when that the paths tracked by the first finger and the second finger keep a constant time delay difference $T_{th1}$. In FIG. 14, it is assumed that the time delay corresponding to the path tracked by the code tracker of the second finger moves from $L_1'$ to $L_1''$, and the timing control signal generated from the code tracker of the first finger is not changed. The timing control signal generated from the code tracker of the second finger is reported to the controller. The controller confirms that the time delay internally tracked by the timing control signal reported from the second finger moved from $L_1'$ to $L_1''$. Thereafter, the controller determines whether $T_{m1}$ reaches a predetermined threshold value $T_{th3}$ by comparing the time delay difference $T_{m1}$ from the time delay $L_0$ tracked by the first finger with $T_{th3}$. Here, it is assumed that the judgment of whether $T_{m1}$ exceeds $T_{th2}$ precedes. Meanwhile, $T_{th3}$ means the time delay difference where no more interference between the adjacent paths exists. Also, $T_{th3}$ may the maximum allowable time delay value which the internal code tracker can process from the present demodulated sample position in the same finger in the case of hardware implementation. If it is determined that $T_{m1}$ reaches $T_{th3}$, the controller outputs a code tracker selection signal for instructing the second finger to refer to the timing control signal internally generated. The second finger selects and uses the timing control signal internally generated among the internally generated timing control signal and the timing control signals from other fingers in accordance with the code tracker selection signal.

In the above-described example, the code trackers which are referred to by the respective fingers allocated with different paths are shown in Table 4 below.

TABLE 4

| Object Finger | Code Tracker to be Controlled |
|---|---|
| First Finger | First Code Tracker |
| Second Finger | Second Code Tracker |
| Third Finger | Third Code Tracker |

As shown in Table 4, the second finger abandons the timing control from the first finger, and is under the timing control internally generated. This means that it has escaped from danger of the fat finger phenomenon that may occur if the time delay difference between the adjacent paths is small and the power difference is large in the multi-path environment.

Meanwhile, in the above-described examples, the path of the first finger referred to by the second finger moves in the direction that becomes more distant from the path referred to by itself, and thus the state that the time delay difference Td1 increases is not considered. However, by moving the time delay of the path tracked by the first finger on the assumption that the time delay of the actual path caused by the code tracker of the second finger is fixed, the states as shown in FIGS. 13 and 14 may be produced. That is, as the time delay of the path tracked by the first finger moves in the direction that becomes more distant from the time delay of the path tracked by the second finger, $T_{m1}$ may be larger than $T_{th3}$. If so, the controller may control the second finger to perform the path tracking with reference to its own timing control signal.

As described above, the apparatus and method according to the present invention can prevent the fat finger phenomenon that fingers for demodulating multi-path signals having different time delays track the same path from occurring in a direct sequence CDMA communication system, and thus can be adapted to moving channels with the receiving quality heightened.

Also, the apparatus and method according to the present invention can demodulate signals with time intervals among paths maintained without producing the fat finger phenomenon by allocating four fingers with one chip interval (about 260 ns) to a case-3 channel proposed in the 3GPP and making the finger only follow the timing control of the code tracker of the path having the largest power, and thus a superior receiving performance can be anticipated.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for making different fingers track multi-path signals allocated to the respective fingers in a rake receiving apparatus in which the respective fingers are allocated with the multi-path signals received through different paths and demodulate the multi-path signals allocated to the respective fingers, the apparatus comprising:

the fingers, each receiving timing control signals generated from other fingers in order to track the allocated multi-path signals and tracking the multi-path signal allocated to the corresponding finger by selecting any one of the timing control signals of other fingers and an internal timing control signal in accordance with code tracker selection signals; and a controller for receiving the timing control signals from the fingers, and outputting the code tracker selection signals corresponding to the respective fingers in accordance with differences among time delays being tracked by the fingers allocated with adjacent path signals.

2. The apparatus as claimed in claim 1, wherein the controller, if the time delay differences among the plurality of fingers confirmed by the timing control signals of the plurality of fingers allocated with the adjacent path signals approach a predetermined minimum reference time delay difference, outputs the code tracker selection signal for selecting the timing control signal from the first finger having the largest path power among the plurality of fingers to the second finger.

3. The apparatus as claimed in claim 2, wherein the controller, if the time delay difference between the first finger and the second finger confirmed by the internal timing control signal from the second finger that is selecting the timing control signal from another finger and the timing control signal from the first finger exceeds a predetermined maximum reference time delay difference, outputs the code tracker selection signal for instructing the second finger to select the internal timing control signal.

4. The apparatus as claimed in claim 2, wherein the controller, if the time delay difference between the first finger and the second finger confirmed by the internal timing control signal from the second finger that is selecting the timing control signal from another finger and the timing control signal from the first finger is within a predetermined movable range, outputs the code tracker selection signal for instructing the second finger to select the internal timing control signal when an estimated tracking path of the second finger is in a direction where the time delay difference increases.

5. The apparatus as claimed in claim 4, wherein the controller, if the ratio of an early-hypothesis path power to a late-hypothesis path power on the basis of the time delay corresponding to the internal timing control signal from the second finger is larger than a predetermined reference power ratio, determines that the estimated tracking path of the second finger is in the direction where the time delay difference increases.

6. A method of making different fingers track multi-path signals allocated to the respective fingers in a rake receiving apparatus in which the respective fingers are allocated with the multi-path signals received through different paths and demodulate the multi-path signals allocated to the respective fingers, the method comprising the steps of:
outputting code tracker selection signals corresponding to the respective fingers in accordance with differences among time delays being tracked by the fingers allocated with adjacent path signals with reference to timing control signals generated from the respective fingers in order to track the allocated multi-path signals;
the respective finger selecting any one of the timing control signals of other fingers and an internal timing control signal in accordance with the code tracker selection signals; and
tracking the path signal allocated to the corresponding finger using the selected timing control signal.

7. The method as claimed in claim 6, wherein if the time delay differences among the plurality of fingers confirmed by the timing control signals of the plurality of fingers allocated with the adjacent path signals approach a predetermined minimum reference time delay difference, the code tracker selection signal for selecting the timing control signal from the first finger having the largest path power among the plurality of fingers is output to the second finger.

8. The method as claimed in claim 7, wherein if the time delay difference between the first finger and the second finger confirmed by the internal timing control signal from the second finger that is selecting the timing control signal from another finger and the timing control signal from the first finger exceeds a predetermined maximum reference time delay difference, the code tracker selection signal for instructing the second finger to select the internal timing control signal is output.

9. The method as claimed in claim 7, wherein if the time delay difference between the first finger and the second finger confirmed by the internal timing control signal from the second finger that is selecting the timing control signal from another finger and the timing control signal from the first finger is within a predetermined movable range, the code tracker selection signal for instructing the second finger to select the internal timing control signal when an estimated tracking path of the second finger is in a direction where the time delay difference increases is output.

10. The method as claimed in claim 9, wherein if the ratio of an early-hypothesis path power to a late-hypothesis path power on the basis of the time delay corresponding to the internal timing control signal from the second finger is larger than a predetermined reference power ratio, it is determined that the estimated tracking path of the second finger is in the direction where the time delay difference increases.

11. An apparatus for making different fingers track multi-path signals allocated to the respective fingers in a rake receiving apparatus in which the respective fingers are allocated with the multi-path signals received through different paths and demodulate the multi-path signals allocated to the respective fingers, the apparatus comprising:
a code tracker for generating an internal timing control signal for obtaining an optimum sample position from the allocated path signals;
a timing control signal selector for receiving the internal timing control signal from the code tracker and the timing control signals from other fingers, and selecting and outputting any one of the internal timing control signal and the timing control signals from other fingers in accordance with a time delay difference between the finger allocated with the path signal and the finger allocated with an adjacent path signal; and
a demodulator for demodulating the allocated path signal in accordance with the selected timing control signal.

12. The apparatus as claimed in claim 11, wherein if the time delay differences among the plurality of fingers confirmed by the timing control signals of the plurality of fingers allocated with the adjacent path signals approach a predetermined minimum reference time delay difference, the timing control signal from the first finger having the largest path power among the plurality of fingers is selected.

13. The apparatus as claimed in claim 12, wherein if the time delay difference between the first finger and the second finger confirmed by the internal timing control signal from the second finger that is selecting the timing control signal from another finger and the timing control signal from the first finger exceeds a predetermined maximum reference time delay difference, the second finger is made to select the internal timing control signal.

14. The apparatus as claimed in claim 12, wherein if the time delay difference between the first finger and the second finger confirmed by the internal timing control signal from the second finger that is selecting the timing control signal from another finger and the timing control signal from the first finger is within a predetermined movable range, the second finger is made to select the internal timing control signal when an estimated tracking path of the second finger is in a direction where the time delay difference increases.

15. The apparatus as claimed in claim 14, wherein if the ratio of an early-hypothesis path power to a late-hypothesis path power on the basis of the time delay corresponding to the internal timing control signal from the second finger is larger than a predetermined reference power ratio, it is determined that the estimated tracking path of the second finger is in the direction where the time delay difference increases.

16. A method of making different fingers track multi-path signals allocated to the respective fingers in a rake receiving apparatus in which the respective fingers are allocated with the multi-path signals received through different paths and demodulate the multi-path signals allocated to the respective fingers, the method comprising the steps of:
- generating an internal timing control signal for obtaining an optimum sample position from the allocated path signals;
- receiving the internal timing control signal and the timing control signals from other fingers, selecting and outputting any one of the internal timing control signal and the timing control signals from other fingers in accordance with a time delay difference between the finger allocated with the path signal and the finger allocated with an adjacent path signal; and
- demodulating the allocated path signal in accordance with the selected timing control signal.

17. The method as claimed in claim 16, wherein if the time delay differences among the plurality of fingers confirmed by the timing control signals of the plurality of fingers allocated with the adjacent path signals approach a predetermined minimum reference time delay difference, the timing control signal from the first finger having the largest path power among the plurality of fingers is selected.

18. The method as claimed in claim 17, wherein if the time delay difference between the first finger and the second finger confirmed by the internal timing control signal from the second finger that is selecting the timing control signal from another finger and the timing control signal from the first finger exceeds a predetermined maximum reference time delay difference, the second finger is made to select the internal timing control signal.

19. The method as claimed in claim 17, wherein if the time delay difference between the first finger and the second finger confirmed by the internal timing control signal from the second finger that is selecting the timing control signal from another finger and the timing control signal from the first finger is within a predetermined movable range, the second finger is made to select the internal timing control signal when an estimated tracking path of the second finger is in a direction where the time delay difference increases.

20. The method as claimed in claim 19, wherein if the ratio of an early-hypothesis path power to a late-hypothesis path power on the basis of the time delay corresponding to the internal timing control signal from the second finger is larger than a predetermined reference power ratio, it is determined that the estimated tracking path of the second finger is in the direction where the time delay difference increases.

* * * * *